(12) United States Patent
Cho et al.

(10) Patent No.: US 8,664,820 B2
(45) Date of Patent: Mar. 4, 2014

(54) ELECTRIC MOTOR-DRIVEN COMPRESSOR FOR VEHICLE

(75) Inventors: Seonk Kook Cho, Daejeon-si (KR); Kyung Hun Jung, Daejeon-si (KR); Kyung Seok Cho, Daejeon-si (KR); Chan Ho Baek, Daejeon-si (KR)

(73) Assignee: Halla Climate Control Corporation (KR)

( * ) Notice: Subject to any disclaimer, the term of this patent is extended or adjusted under 35 U.S.C. 154(b) by 147 days.

(21) Appl. No.: 13/209,679

(22) Filed: Aug. 15, 2011

(65) Prior Publication Data

US 2012/0070322 A1 Mar. 22, 2012

(51) Int. Cl.
 *H02K 1/27* (2006.01)
(52) U.S. Cl.
 USPC .................................. 310/156.45; 310/156.53
(58) Field of Classification Search
 USPC .................... 310/156, 156.45, 156.53, 156.56
 See application file for complete search history.

(56) References Cited

U.S. PATENT DOCUMENTS

| 6,008,559 | A | * | 12/1999 | Asano et al. | 310/156.53 |
| 6,013,963 | A | * | 1/2000 | Shelton, Jr. | 310/179 |
| 7,521,833 | B2 | * | 4/2009 | Adaniya et al. | 310/156.53 |
| 2010/0026128 | A1 | * | 2/2010 | Ionel | 310/156.53 |
| 2010/0133940 | A1 | * | 6/2010 | Grossmann et al. | 310/156.46 |
| 2011/0068652 | A1 | * | 3/2011 | Qin et al. | 310/156.53 |

FOREIGN PATENT DOCUMENTS

| JP | 08 247030 | 9/1996 |
| JP | 2004 245227 | 9/2004 |
| JP | 2005 1306 27 | 5/2005 |
| JP | 3740 482 | 11/2005 |
| JP | 2007 330060 | 12/2007 |
| JP | 4123 436 | 5/2008 |
| JP | 2009150235 | 7/2009 |
| KR | 11-299199 | 10/1999 |
| KR | 1020 030 0634 12 | 7/2003 |
| KR | 2007 236096 | 9/2007 |
| KR | 10 2007 0113192 | 11/2007 |
| KR | 2009 150235 | 7/2009 |
| KR | 2010 059809 | 3/2010 |
| KR | 2010059809 | 3/2010 |

* cited by examiner

*Primary Examiner* — Dang Le
(74) *Attorney, Agent, or Firm* — Daniel A. Thomson; Emerson Thomson Bennett, LLC

(57) ABSTRACT

Disclosed is an electric motor-driven compressor having a structure capable of improving the performance of an electric motor of the electric motor-driven compressor for the vehicle. The electric motor-driven compressor has an angle which is formed by two straight lines passing through a center of the rotor and making contact with both end portions of one permanent magnet, and is in a range of about 48.7° to about 51°. The cogging torque and the torque ripples are minimized, the power of the electric motor is improved, and the electric motor is easily controlled.

12 Claims, 8 Drawing Sheets

ELECTRIC MOTOR-DRIVEN COMPRESSOR FOR VEHICLE

BACKGROUND OF THE INVENTION

1. Field of the Invention

This document relates to an electric motor-driven compressor for a vehicle. More particularly, this document relates to an electric motor-driven compressor having a structure capable of improving the performance of an electric motor of the electric motor-driven compressor for the vehicle.

2. Description of the Related Art

Recently, an electric vehicle or a hybrid vehicle employing both fossil fuel and electricity as a driving source has been spotlighted according to the policy of low-pollution and high fuel efficiency policy derived from depletion of the fossil fuel and the environmental pollution, so the researches on the above vehicles have been actively performed.

The hybrid vehicle or the electric vehicle obtains driving power through an electric motor. Accordingly, an electric compressor has been extensively used for an air conditioning system of a vehicle instead of a mechanical compressor.

The electric compressor includes an electric motor to convert electrical energy into dynamic energy and an inverter to control the rotation of the electric motor. The electric motor of the electric compressor typically includes a cylindrical rotor and a stator surrounding the rotor and including the coil wound around the stator. A distributed winding scheme or a concentrated winding scheme may be employed according to the winding scheme of the coil.

In the electric compressor, as current flows through a coil by power supplied from the inverter, the rotor of the electric motor is rotated, and the rotational force of the rotor is transferred to a rotational shaft. In addition, a mechanical unit, which has received the dynamic energy from the rotational shaft, reciprocates to compress the coolant.

When comparing with the conventional mechanical compressor, the performance to compress the coolant of the electric compressor is degraded. This is because the electric compressor represents the weak driving force generated by the electric motor, great vibration, and the degraded control performance of the inverter when comparing with the mechanical compressor driven by using the rotational force of an engine.

In addition, since the electric motor represents low efficiency, the electricity supplied to the vehicle may be wasted.

Examples of factors causing the vibration of the electric motor and reducing the precision of the electric motor are cogging torque and torque ripples caused by the interaction between a permanent magnet and a slot. The cogging torque and the torque ripples inevitably exist in the motor having slots.

The cogging torque is a force applied to a motor system in a radial direction so that the motor system intends to move to the position representing the minimum magnetic energy, that is, to an equilibrium state. The cogging torque is irregular torque generated due to the mutual relation of a pole of a permanent magnet and a slot regardless of load current and exerts a great influence on the control and precision of a motor.

In order to reduce the cogging torque, a scheme of reducing the cogging torque by properly combining the number of magnetic poles of a permanent magnet with the number of slots is generally known in the art.

However, in the fields of an electric motor used in a compressor for a hybrid vehicle, researches and studies have been rarely carried out with respect to the optimal ratio of the number of magnetic poles to the number of slots, or the structure and the design for reducing cogging torque and torque ripples.

SUMMARY OF THE INVENTION

In one implementation, an electric motor-driven compressor is disclosed. The electric motor including a stator, which has a cylindrical shape and an inner part perforated in an axial direction and is provided in an internal circumferential surface thereof with a plurality of winding slots extending in parallel to the axial direction such that a coil is wound therein and a rotor having the cylindrical shape and coaxially provided in the stator. Six permanent magnets are inserted into the rotor in the axial direction, and an angle formed by two straight lines passing through a center of the rotor and making contact with both end portions of one permanent magnet is in a range of about 48.7° to about 51°.

This summary is not intended to identify key features or essential features of the claimed subject matter, nor is it intended to be used as said in determining the scope of the claimed subject matter.

DETAILED DESCRIPTION OF THE PREFERRED IMPLEMENTATIONS

Hereinafter, an electric motor-driven compressor according to exemplary implementations of the present invention will be described with reference to accompanying drawings in detail.

In general, an electric motor-driven compressor for a vehicle includes a compressing part in which a coolant is compressed by the reciprocation of machinery components, an electric motor to transfer mechanical energy to the compressing part, and an inverter to supply electrical energy to the electric motor.

However, the main component of the present invention is provided in the structure of the electric motor, and remaining components of the compressor are substantially identical to those of a typical electric compressor for a vehicle. Therefore, hereinafter, the electric motor-driven compressor according to the present invention will be described while focusing on the electric motor.

Figure 1:
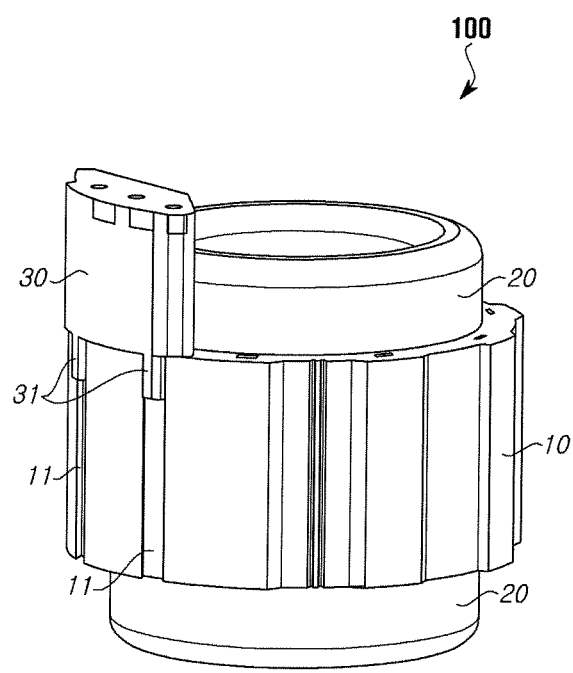
FIG. 1 is a schematic perspective view showing the structure of an electric motor for a vehicle compressor according to a detailed implementation of the present invention.
Figure 2:
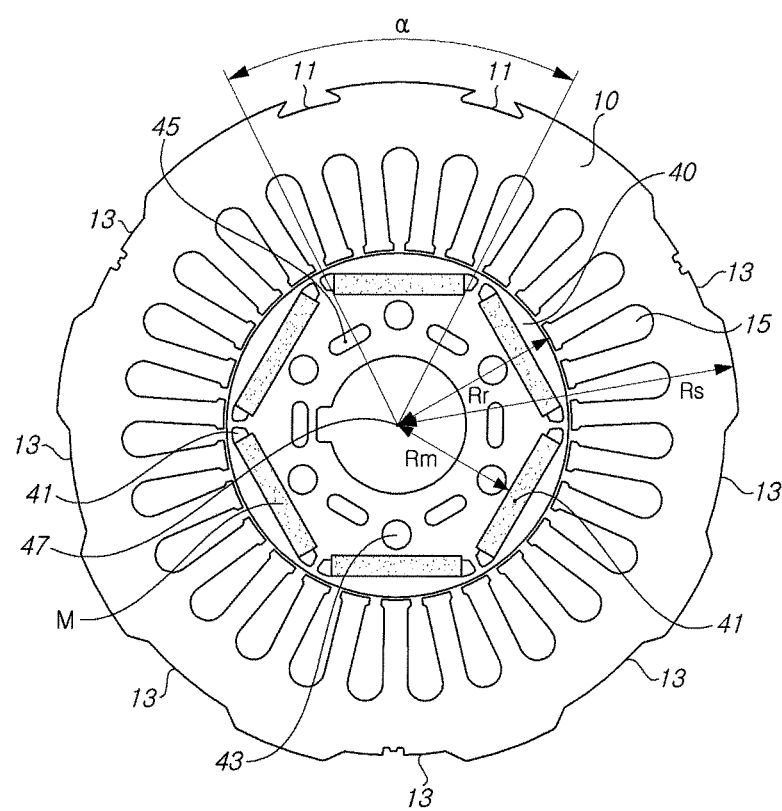
FIG. 2 is a cross-sectional view showing the electric motor for the vehicle compressor according to the detailed implementation of the present invention.

FIG. 1 is a schematic perspective view showing the structure of an electric motor 100 for a vehicle compressor according to the detailed implementation of the present invention, and FIG. 2 is a cross-sectional view showing the electric motor 100 for the vehicle compressor according to the detailed implementation of the present invention.

As shown in FIGS. 1 and 2, the electric motor 100 for the vehicle compressor according to the implementation of the present invention includes a stator 10 having a substantially cylindrical shape. The stator 10 has a ring-shape formed therein with a cylindrical hole as can be seen from the cross-sectional view of FIG. 2.

The stator 10 is provided on an internal circumferential surface thereof with a plurality of winding slots 15 extending in the penetration direction of the stator 10. A coil is wound around the winding slot 15 in the extension direction of the winding slot 15. The number of the winding slots 15 may vary according to the design of the electric motor 100. According to the implementation of the present invention, twenty-seven (27) winding slots 15 may be provided at a uniform interval. In other words, each winding slot 15 forms an angle of about 13.3° with respect to an adjacent winding slot 15.

Meanwhile, a coil bundle wound around the winding slot 15 is exposed to the outside at both ends of the stator 10 to form an end-turn 20. The end-turn 20 is exposed by a predetermined length from the stator 10 at both ends of the stator 10.

In addition, a connector 30 may be fixed onto an outer circumferential surface of the stator 10. The connector 30 fixedly surrounds a plurality of terminals provided on end portions of coils extending from the end-turn 20.

The connector 30 has the form of a single body including thermoplastic resin and provided therein with a plurality of terminals. At least one protrusion may extend from the body while being integrated with the body so that the body can be fixed onto the outer circumferential surface of the stator 10. Further, the connector 30 may have a bent shape so that the connector 30 does not interfere with the end-turn 20. Since the connector 30 is fixed onto the stator 10 as described above, the connector 30 can be supported to the stator 10 in the axial direction.

To this end, a fixing slot 11 may be formed at one side of the outer circumferential surface of the stator 10 so that the body of the connector 30 is directly fixed to the stator 10. The fixing slot 11 is recessed at a predetermined depth from the outer circumferential surface of the stator 10, and the width of the fixing slot 11 is increased toward the center of the stator 10 as shown in FIG. 2, so that the connector 30 cannot be easily released from the fixing slot 11.

Meanwhile, a plurality of grooves 13 are recessed in the outer circumferential surface of the stator 10, thereby forming a coolant passage. Accordingly, the resistance acting on the coolant can be reduced, so that the performance of the compressor can be improved.

Meanwhile, as shown in FIG. 2, a rotor 40 is installed at the inside of the stator 10 having the cylindrical hole. In this case, FIG. 2 shows the sectional surface of the electric motor 100 without coils.

The rotor 40 is a cylindrical member installed in the perforation of the stator 10, and may include a plurality of permanent magnets so that the rotor 40 can rotate by receiving electromagnetic force generated as current flows through the coils wound around the stator 10. A rotational shaft (not shown) is connected to the rotor 40 to transfer rotational force to the compressing part provided inside the compressor.

The rotor 40 is provided therein with a plurality of insertion holes 41 defined in parallel to the rotational shaft of the rotor 40 so that the permanent magnets M can be inserted into the insertion holes 41. The permanent magnet M is inserted into the insertion holes 41 in the direction of the rotational shaft of the rotor 40. The permanent magnets M having poles opposite to each other are inserted into adjacent insertion holes 41. If the permanent magnet M is inserted in the inner part of the rotor 40 instead of being mounted on the surface of the rotor 40 as described above, magnetic torque (torque related with an arrangement of a magnetic field and intensity of the magnetic field) and reluctance torque (torque related with the variation of magnetic resistance) may be used. Accordingly, since the same torque can occur by using a smaller amount of current, the efficiency of the electric motor 100 can be increased.

Six insertion holes 41 and six permanent magnets M are provided to each rotor 40. In other words, the two adjacent insertion holes 41 form an angle of 120°.

Meanwhile, the rotor 40 may be formed therein with a plurality of rivet holes 43 if necessary. A rivet (not shown) may be inserted into the rivet hole 43. In addition, a plurality of through holes 45 may be formed through the rotor 40 in the direction of the rotational shaft.

The rotor 40 is provided in the central portion thereof with a shaft hole 47 receiving the rotational shaft to transfer the rotational force of the rotor 40 to the compressing part of the compressor.

In the electric motor 100 having the above structure, six permanent magnets M are provided to maximize the efficiency of the electric motor 100 while providing the optimal number of poles based on the switch frequency of the inverter, and twenty-seven winding slots 15 may be provided corresponding to the six permanent magnets M to minimize the total harmonic distortion of no-load counter electromotive force.

On the assumption that an arc angle formed between two straight lines extending from the center of the rotor 40 to pass through both ends of each permanent magnet M inserted into the insertion hole 41 is $\alpha$, the arc angle $\alpha$ may be preferably formed in the range of about 48.7° to about 51° in the electric motor 100 having twenty-seven winding slots 15 and six permanent magnets M.

If the cogging torque of the electric motor 100 for the compressor is 3% or less of the rated torque of the electric motor 100, the vibration and noise of the electric motor 100 caused by the cogging torque can be minimized. Accordingly, the cogging torque, preferably, has a value corresponding to 3% or less of the rated torque. In order to find the range of the arc angle α to satisfy the above condition, various experiments have been carried out by the present inventor. Hereinafter, the range of the arc angle α will be described based on the experimental results.

Figure 3:
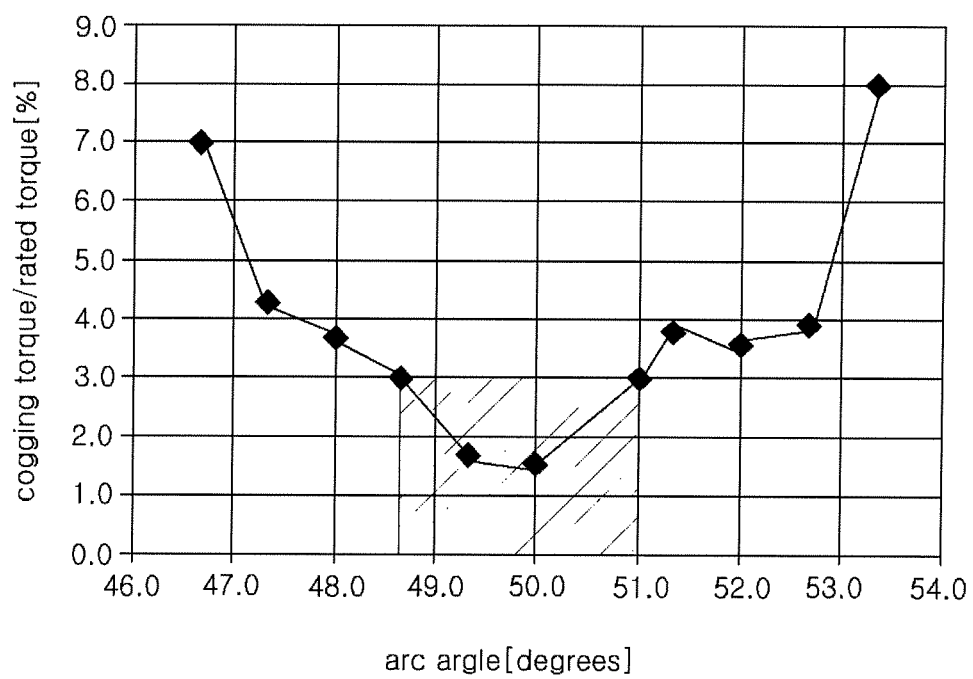
FIG. 3 is a graph representing the variation of the cogging torque according to the size of an arc angle of a permanent magnet in the electric motor for the vehicle compressor according to the detailed implementation of the present invention.

FIG. 3 is a graph representing the variation of the cogging torque according to the size of the arc angle α of the permanent magnet M in the electric motor 100 for the vehicle compressor according to the implementation of the present invention. According to the graph of FIG. 3, when the arc angle α is in the range of about 48.7° to about 51°, the cogging torque has a low value corresponding to 3% or less of the rated torque.

The cogging torque is caused by the interaction between the coil wound around the winding slot of the stator 10 and the permanent magnet M of the rotor 40 when the rotor 40 is rotated in a state that power is not applied to the electric motor 100. Since the cogging torque is not a torque component to be applied to the rotor 40 by applying power, as the value of the cogging torque is lowered, the rotation of the rotor 40 can be easily controlled. Thus, the range of the arc angle α representing low cogging torque can be derived from the graph of FIG. 3.

In addition, if the cogging torque is minimized, torque ripples (the vibration of the torque), which are caused when power is applied, may be reduced, so that the no-load counter electromotive force may be represented in the form of a substantially sinusoidal wave. Accordingly, the control performance of the inverter for the electric motor 100 can be improved, and the vibration or the noise generated from the electric motor 100 can be reduced.

Figure 4:
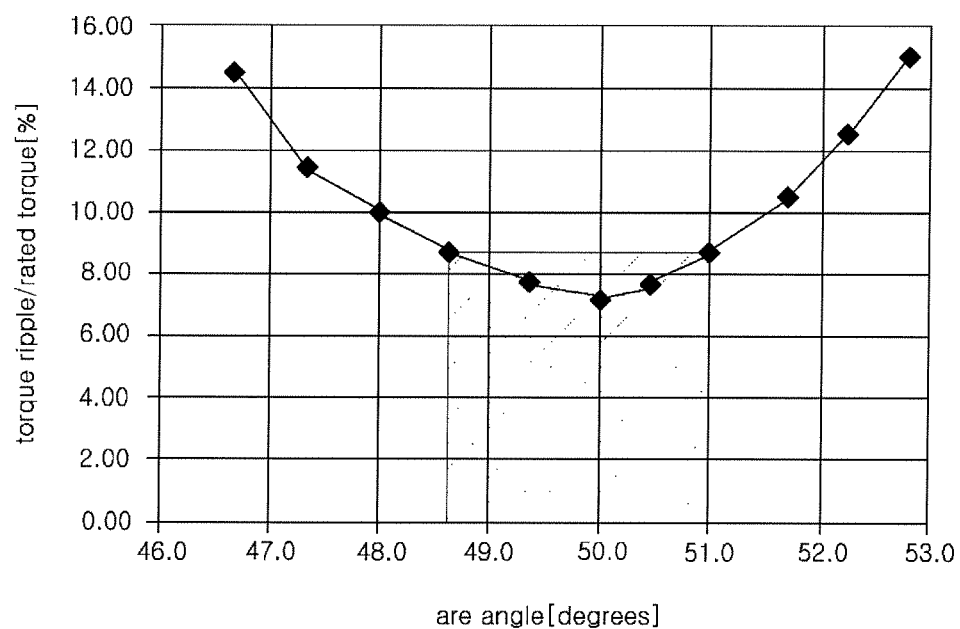
FIG. 4 is a graph showing the variation of torque ripples according to the size of an arc angle of a permanent magnet in the electric motor for the vehicle compressor according to the detailed implementation of the present invention.

FIG. 4 is a graph showing the variation of the torque ripples according to the size of the arc angle α of the permanent magnet M of the electric motor 100 for the vehicle compressor according to the implementation of the present invention. According to the graph of FIG. 4, when the arc angle α is in the range of about 48.7° to about 51° as described above, torque ripples exist within the range less than 9%. Accordingly, the above range of the arc angle α minimizes the cogging torque while minimizing the torque ripples.

Meanwhile, on the assumption that the radius of the rotor 40 is Rr, and the radius of the stator 10 from the center of the rotor 40 is Rs, the ratio Rr/Rs between two radiuses is preferably in the range of about 0.48 to about 0.51 with respect to the range of the arc angle α.

Figure 5:
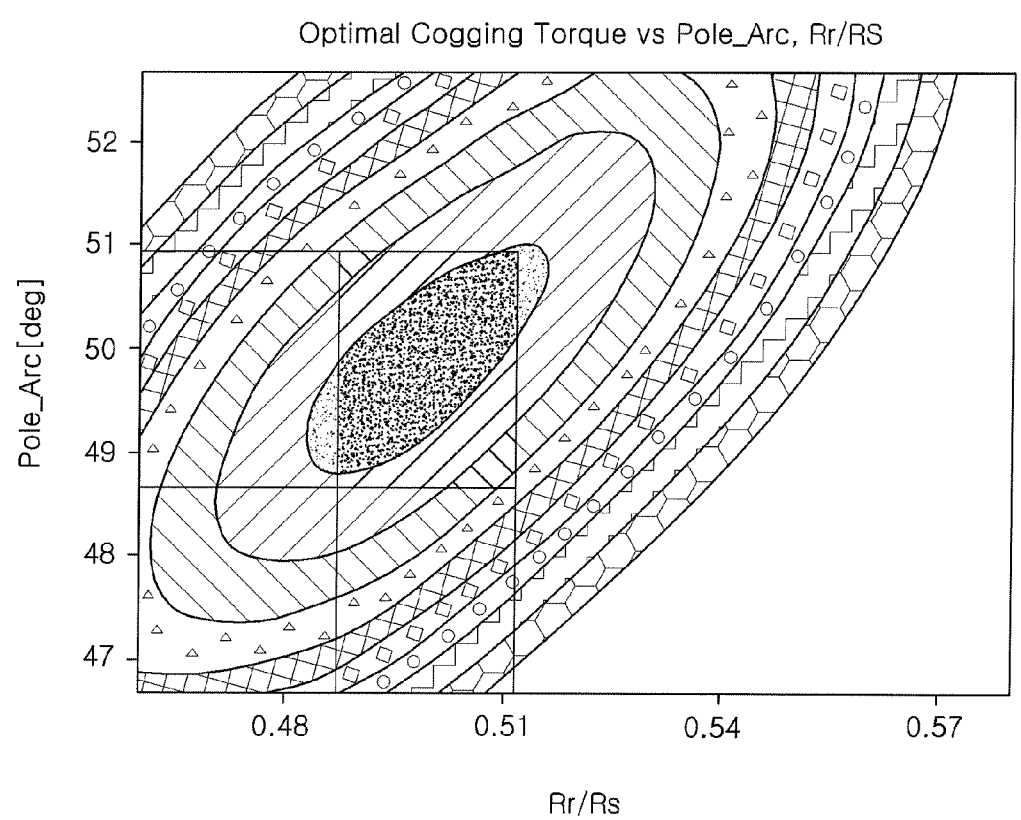
FIG. 5 is a graph showing the characteristic of cogging torque according to the arc angle of the permanent magnet and a ratio of the radius of the rotor to the radius of the stator in the electric motor for the vehicle compressor according to the detailed implementation of the present invention.

FIG. 5 is a graph showing the characteristic of cogging torque according to the arc angle α of the permanent magnet M and the ratio Rr/Rs of the radius Rr of the rotor 40 to the radius Rs of the stator 10 in the electric motor 100 for the vehicle compressor according to the detailed implementation of the present invention.

In other words, as described above, in the region where the cogging torque has a value corresponding to 3% or less of the rated torque, the ratio Rr/Rs of the radius Rr of the rotor 40 to the radius Rs of the stator 10, which allows the arc angle α to be in the range of about 48.7° to about 51°, is in the range of about 0.48 to about 0.51.

Figure 6:
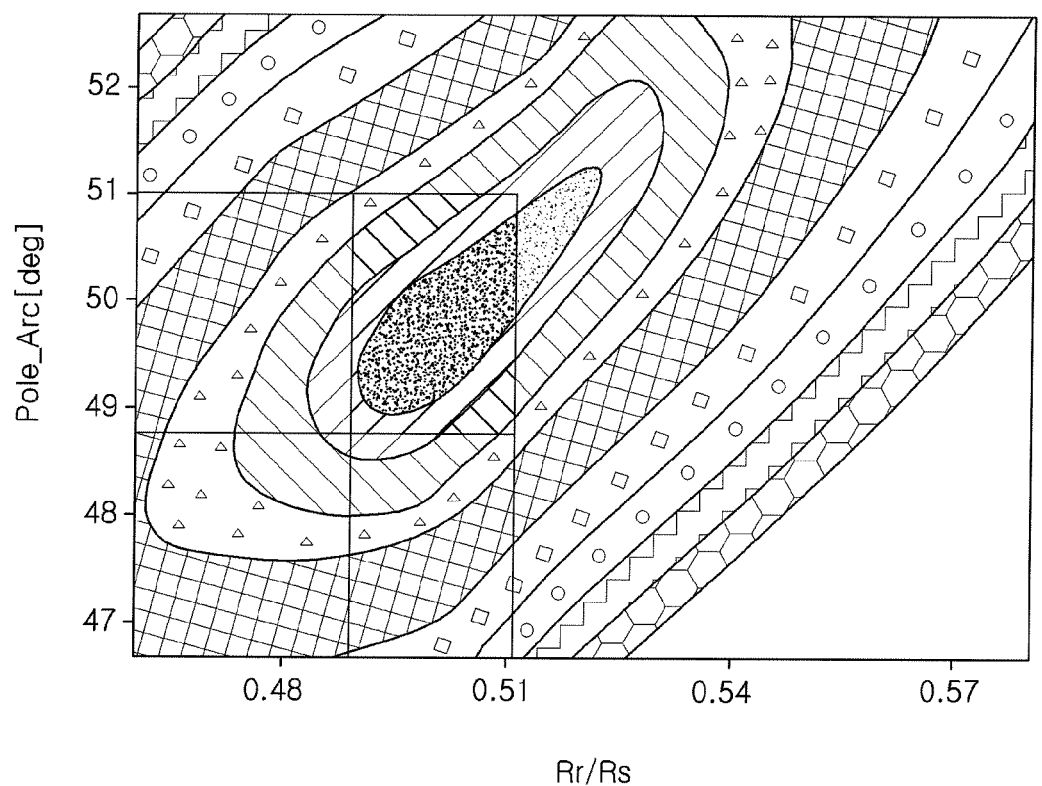
FIG. 6 is a graph showing the characteristic of torque ripples according to the arc angle of the permanent magnet and a ratio of the radius of the rotor to the radius of the stator in the electric motor for the vehicle compressor according to the detailed implementation of the present invention.

In addition, referring to the graph of FIG. 6 representing the characteristic of the torque ripples according to the arc angle α of the permanent magnet M and the ratio Rr/Rs of the radius Rr of the rotor 40 to the radius Rs of the stator 10 in the electric motor 100, when the arc angle α is in the range of about 48.7° to about 51°, the ratio Rr/Rs of the radius Rr of the rotor 40 to the radius Rs of the stator 10, which corresponds to the region wherein the torque ripples are 9% or less, may be in the range of 0.48 to 0.51 similarly to FIG. 5.

In summary, the ratio Rr/Rs of the radius Rr of the rotor 40 to the radius Rs of the stator 10 is preferably in the range of about 0.48 to about 0.51, so that the arc angle α can be in the range of about 48.7° to about 51° corresponding to the region where the cogging torque is about 3% or less and the torque ripples are 9% or less.

Further, as described above, in order to satisfy the condition in which the cogging torque has a value corresponding to 3% or less of the related torque, and the torque ripples are 9% or less, a design factor, that is, the ratio Rm/Rr of the shortest distance Rm, which is measured from the center of the rotor 40 to the permanent magnet M, to the radius Rr of the rotor 40 is preferably in the range of about 0.74 to about 0.78.

Figure 7:
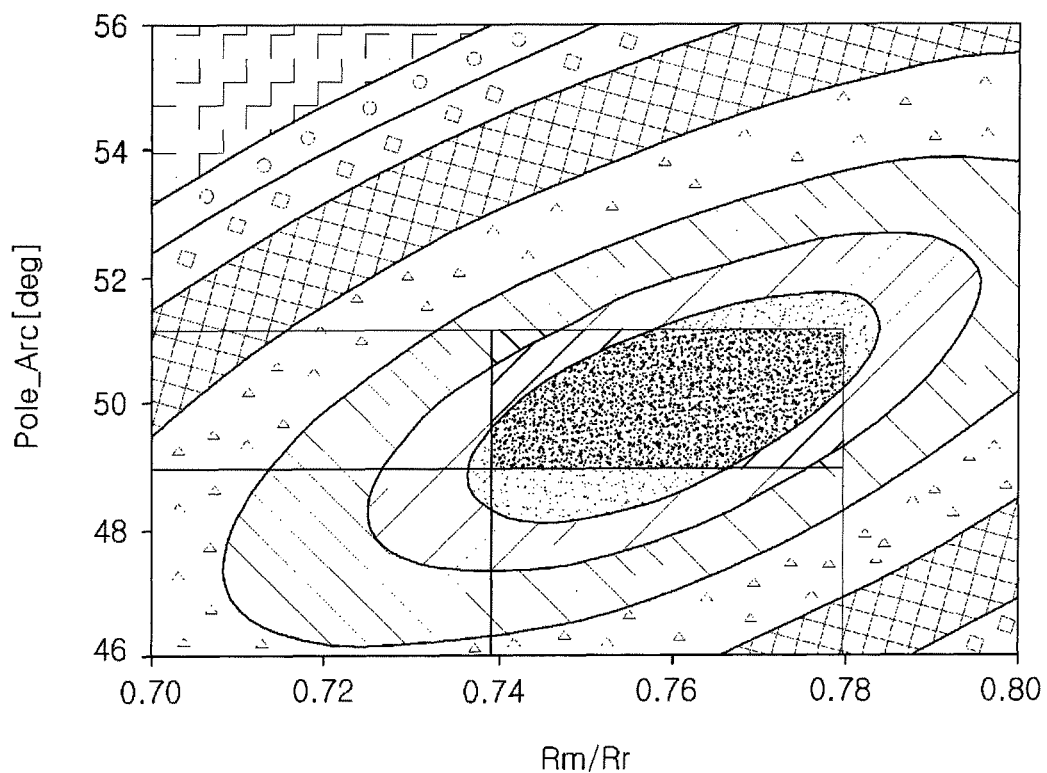
FIG. 7 is a graph representing the characteristic of cogging torque according to the arc angle of the permanent magnet and the ratio of the shortest distance, which is measured from the center of the rotor to the permanent magnet, to the radius of the rotor in the electric motor for the vehicle compressor according to the detailed implementation of the present invention.
Figure 8:
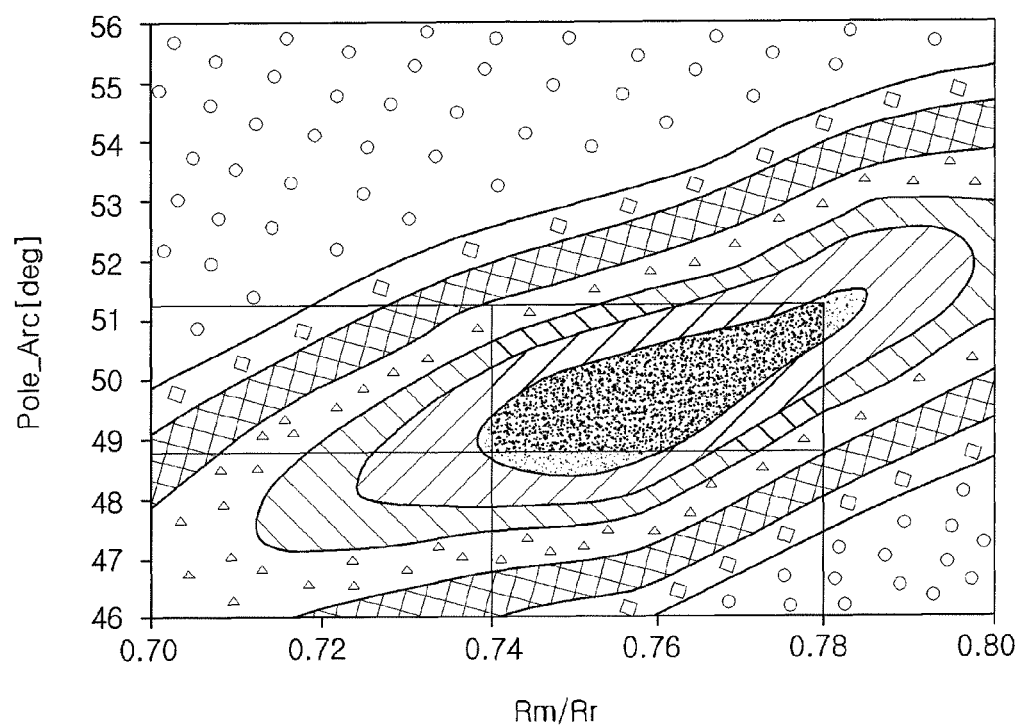
FIG. 8 is a graph representing the characteristic of torque ripples according to the arc angle of the permanent magnet and the ratio of the shortest distance, which is measured from the center of the rotor to the permanent magnet, and the radius of the rotor in the electric motor for the vehicle compressor according to the detailed implementation of the present invention.

FIG. 7 is a graph representing the characteristic of cogging torque according to the arc angle α of the permanent magnet M and the ratio Rm/Rr of the shortest distance Rm, which is measured from the center of the rotor 40 to the permanent magnet M, to the radius Rr of the rotor in the electric motor 100 for the vehicle compressor according to the detailed implementation of the present invention. FIG. 8 is a graph representing the characteristic of torque ripples according to the arc angle α of the permanent magnet M and the ratio Rm/Rr of the shortest distance Rm, which is measured from the center of the rotor 40 to the permanent magnet M, to the radius Rr of the rotor 40 in the electric motor 100 for the vehicle compressor according to the detailed implementation of the present invention.

As shown in FIG. 7, the ratio Rm/Rr of the shortest distance Rm, which is measured from the center of the rotor 40 to the permanent magnet M, to the radius Rr of the rotor 40 is in the range of about 0.74 to about 0.79, so that the arc angle α can be in the range of about 48.7° to about 51° corresponding to the region where the cogging torque has a value of about 3% or less.

In addition, as shown in FIG. 8, the ratio Rm/Rs is in the range of about 0.74 to about 0.78 so that the arc angle α can be in the range of about 48.7° to about 51° corresponding to the region where torque ripples become 9% or less.

Although a preferred implementation of the present invention has been described for illustrative purposes, those skilled in the art will appreciate that various modifications, additions and substitutions are possible, without departing from the scope and spirit of the invention as disclosed in the accompanying claims.

What is claimed is:

1. An electric motor-driven compressor comprising:
an electric motor including a stator, which has a cylindrical shape and an inner part perforated in an axial direction and is provided in an internal circumferential surface thereof with a plurality of winding slots extending in parallel to the axial direction such that a coil is wound therein and a rotor having the cylindrical shape and coaxially provided in the stator,
wherein six permanent magnets are inserted into the rotor in the axial direction, and twenty-seven winding slots are provided along the internal circumferential surface of the stator at a regular interval, wherein an angle formed by two straight lines passing through a center of the rotor and making contact with both end portions of one permanent magnet adjacent to the center of the rotor is in a range of about 48.7° to about 51°, and wherein a ratio of a shortest distance, which is measured from the center of the rotor to each permanent magnet, to the radius of the rotor, is in a range of about 0.74 to about 0.78.

2. The electric motor-driven compressor of claim 1, wherein a ratio of a radius of the rotor to a radius of the stator is in a range of about 0.48 to about 0.51.

3. The electric motor-driven compressor of claim 1, wherein the electric motor employs a distributed winding scheme.

4. The electric motor-driven compressor of claim 1, wherein the compressor further comprises:
   a connector, wherein the connector is fixed onto an outer circumferential surface of the stator.

5. The electric motor-driven compressor of claim 4, wherein the connector fixedly surrounds a plurality of terminals provided on end portions of the coils, wherein the connector forms a single body, wherein the connector is made of thermoplastic resin.

6. The electric motor-driven compressor of claim 5, wherein the compressor further comprises:
   a plurality of grooves recessed in the outer circumferential surface of the stator, thereby forming a coolant passage.

7. The electric motor-driven compressor of claim 6, wherein a cogging torque of about 3% or less of a related torque, and torque ripples are 9% or less.

8. An electric motor-driven compressor comprising:
   an electric motor including a stator, which has a cylindrical shape and an inner part perforated in an axial direction and is provided in an internal circumferential surface thereof with a plurality of winding slots extending in parallel to the axial direction such that a coil is wound therein and a rotor having the cylindrical shape and coaxially provided in the stator, wherein six permanent magnets are inserted into the rotor in the axial direction, and an angle formed by two straight lines passing through a center of the rotor and making contact with both end portions of one permanent magnet adjacent to the center of the rotor is in a range of about 48.7° to about 51°, and wherein a ratio of a shortest distance, which is measured from the center of the rotor to each permanent magnet, to the radius of the rotor, is in a range of about 0.74 to about 0.78.

9. The electric motor-driven compressor of claim 8, wherein the compressor further comprises:
   a connector, wherein the connector is fixed onto an outer circumferential surface of the stator.

10. The electric motor-driven compressor of claim 9, wherein the connector fixedly surrounds a plurality of terminals provided on end portions of the coils, wherein the connector forms a single body, wherein the connector is made of thermoplastic resin.

11. The electric motor-driven compressor of claim 10, wherein the compressor further comprises:
    a plurality of grooves recessed in the outer circumferential surface of the stator, thereby forming a coolant passage.

12. The electric motor-driven compressor of claim 11, wherein a cogging torque of about 3% or less of a related torque, and torque ripples are 9% or less.

* * * * *